(12) United States Patent
Garg et al.

(10) Patent No.: US 7,457,791 B1
(45) Date of Patent: Nov. 25, 2008

(54) USING INVARIANTS TO VALIDATE APPLICATIONS STATES

(75) Inventors: Neeraj Garg, Delhi (IN); Cale D. Carter, Redmond, WA (US); Kulothungan Rajasekaran, Sammamish, WA (US); Deuane J. Martin, Seattle, WA (US); Pankaj K. Singh, Redmond, WA (US); Mahesh Jayaram, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 841 days.

(21) Appl. No.: 10/449,208

(22) Filed: May 30, 2003

(51) Int. Cl.
  *G06N 5/00* (2006.01)
(52) U.S. Cl. .......................................... 706/47; 706/45
(58) Field of Classification Search .................. 706/45, 706/47; 707/5; 709/202, 230; 726/22; 235/472.01; 375/265; 715/716; 382/123; 700/83
See application file for complete search history.

(56) References Cited

U.S. PATENT DOCUMENTS

| | | | |
|---|---|---|---|
| 4,570,217 A * | 2/1986 | Allen et al. ................. 700/83 |
| 5,051,745 A | 9/1991 | Katz | |
| 5,138,615 A | 8/1992 | Lamport et al. | |
| 5,727,202 A | 3/1998 | Kucala | |
| 5,790,776 A | 8/1998 | Sonnier et al. | |
| 5,832,489 A | 11/1998 | Kucala | |
| 5,872,971 A | 2/1999 | Knapman et al. | |
| 5,884,323 A | 3/1999 | Hawkins et al. | |
| 5,907,703 A | 5/1999 | Kronenberg et al. | |
| 5,978,814 A | 11/1999 | Miller et al. | |
| 6,021,491 A | 2/2000 | Renaud | |
| 6,049,861 A | 4/2000 | Bird et al. | |
| 6,151,689 A | 11/2000 | Garcia et al. | |
| 6,202,207 B1 | 3/2001 | Donohue | |
| 6,253,213 B1 | 6/2001 | Vanderschaaf | |
| 6,438,724 B1 | 8/2002 | Cox et al. | |
| 6,446,234 B1 | 9/2002 | Cox et al. | |
| 6,470,448 B1 | 10/2002 | Kuroda et al. | |
| 6,519,733 B1 | 2/2003 | Har et al. | |
| 6,529,506 B1 | 3/2003 | Yamamoto et al. | |
| 6,587,577 B1 * | 7/2003 | Finkelstein ................. 382/123 |
| 6,647,494 B1 | 11/2003 | Drews | |
| 6,665,725 B1 * | 12/2003 | Dietz et al. .................. 709/230 |
| 6,823,398 B1 | 11/2004 | Lee et al. | |
| 6,850,252 B1 * | 2/2005 | Hoffberg ..................... 715/716 |
| 6,901,398 B1 * | 5/2005 | Horvitz et al. ................. 707/5 |

(Continued)

FOREIGN PATENT DOCUMENTS

EP          717353 A2     6/1996

OTHER PUBLICATIONS

B. Awerbuch and L.J. Schulman. The Maintenance of Common Data in Distributed System. Journal of the ACM, vol. 44 No. 1, 1997. 17 pages.

(Continued)

*Primary Examiner*—Wilbert L Starks, Jr.
(74) *Attorney, Agent, or Firm*—Amin, Turocy & Calvin, LLP

(57) ABSTRACT

Architecture that facilitates discerning integrity of a data handling system. The architecture includes an identification component that periodically applies to data, in a batch mode, a context-based rule, the rule identifying anamolous data that does not satisfy the rule. A healing component is included to further rectify and/or flag the identified anomalous data.

48 Claims, 10 Drawing Sheets

U.S. PATENT DOCUMENTS

| | | | |
|---|---|---|---|
| 6,938,109 | B1 | 8/2005 | Sliger et al. |
| 6,975,727 | B1 | 12/2005 | Vandergeest |
| 7,010,052 | B2 * | 3/2006 | Dill et al. .................... 375/265 |
| 7,128,270 | B2 * | 10/2006 | Silverbrook et al. ... 235/472.01 |
| 7,200,603 | B1 | 4/2007 | Hitz et al. |
| 2001/0043603 | A1 | 11/2001 | Shaohua |
| 2002/0116404 | A1 | 8/2002 | Cha et al. |
| 2003/0028867 | A1 | 2/2003 | Kryloff et al. |
| 2003/0088791 | A1 | 5/2003 | Porras et al. |
| 2003/0144990 | A1 | 7/2003 | Benelisha et al. |
| 2004/0133629 | A1 | 7/2004 | Reynolds et al. |
| 2004/0177110 | A1 * | 9/2004 | Rounthwaite et al. ....... 709/202 |
| 2004/0215977 | A1 * | 10/2004 | Goodman et al. ........... 713/201 |
| 2005/0055385 | A1 | 3/2005 | Sinha et al. |
| 2006/0110199 | A1 | 5/2006 | Walmsley et al. |
| 2006/0248128 | A1 | 11/2006 | Acharya et al. |

OTHER PUBLICATIONS

J. Cho and H. Garcia-Molina. Synchronizing a Database to Improve Freshness. Proceedings of the 2000 ACM SIGMOD Conference, pp. 117-128, 2000.

W. Hou and Z. Zhang. Enhancing Database Correctness: a Statistical Approach. Proceedings of the 1995 ACM SIGMOD Conference, pp. 223-232, 1995.

Kim, et al., "The Design and Implementation of Tripowire: A File System Integrity Chcker", Nov. 1994, ACM Proceedings of the 2nd ACM Conference on Computer and Communications security, ACM, p. 18-29.

Kespret, "PKZip, LHArc & co.", Dec. 1995, Abacus A Data Becker Book, p. 2, 107, 152-153, 222-232.

Chawathe, et al., "Meaningful Change Detection in Structured Data", 1997, ACM SIGMOD, ACM, p. 26-37.

Terran Lane and Carla E. Brodley, "Detecting the Abnormal: Machine Learning in Computer Security", School of Electrical and Computer Engineering, Jan. 31, 1997, 20 pages.

Sangeun Kim, Peter In, and Ramesh Bharadwaj, "An Extended Framework for the Validation and Verification of Situation-Aware Middleware Architectures", In Proceedings Ground Systems Architectures Workshop, Mar. 2003, 3 pages.

Kespret, PKZip, LHArc & co., Dec. 1995, Abacus A Data Becker Book, p. 88-89.

* cited by examiner

USING INVARIANTS TO VALIDATE APPLICATIONS STATES

TECHNICAL FIELD

This invention relates to data handling systems, and more specifically, to methods for ensuring integrity of the data handling system by checking the integrity of the data it handles using invariants.

BACKGROUND OF THE INVENTION

Dirty data is a worldwide problem. Dirty data can cause reliability problems, since the code written did not expect to find dirty data, and will certainly impact user satisfaction. Early detection of dirty data leads to catching bugs and problems before impacting more customers, and becoming harder to fix. This is especially important when data is migrated from an old application to a new application, since migration tools may generate states in the system that may not have happened at normal run time.

Consistency of data is oftentimes a requirement in complex, distributed applications. For example, if a user paid for a service, then services must have been delivered, or vice versa. Applications normally try to achieve consistency by using transactions and constraints. Most RDBMS (Relational Database Management System) software provides these facilities. For example, "asserts" have long been used in the C programming world to detect problems at run time. However, many times support from core database engines is not enough, due to a number of factors, including, but not limited to, spatial separation, expressibility, performance, temporal separation, software, and validation.

Spatial separation is where data is split over multiple databases. For example, a "User Paid" set of data may be maintained in a totally different database than the "Services Delivered" data. Distributed Transactions architecture, a conventional transaction processing mechanism for systems, solves this problem for databases connected to each other.

Further, when using a conventional constraint approach, some constraints cannot be expressed in the database constraint language, resulting in expressibility problems. Poor constraint performance at the database level can cause performance degradation, and may even cause a lock. However, the use of constraints, transactions, and distributed transaction solutions try to solve the same problem through avoidance.

Some data changes become "eventually" become consistent rather than consistent all the time. For example, the "Services Delivered" database may be in some queue and will eventually be delivered. Thus the "Services Delivered" database cannot be queried at the same time as the "User Paid" data, causing temporal separation. Additionally, some software components of the consistency check may not provided transactional support. While tools exist to implement the validation solution, using the tool to verify correctness of the tool itself, does not help.

What is needed is a technology that verifies if the tools are working correctly by detecting inconsistencies. Furthermore, a verification mechanism is needed to determine if the tools are working correctly without effecting performance of the live system.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a preclude to the more detailed description that is presented later.

The present invention disclosed and claimed herein, in one aspect thereof, comprises architecture that involves data consistency tools that define application level (or specific) invariants. The tool includes an identification component that periodically applies to data, in a batch mode, a context-based rule, the rule identifying anomalous data that does not satisfy the rule, and a healing component that rectifies and/or flags the identified anomalous data.

An invariant is conceptually a statement that when executed, has a Boolean result. For example, if logically TRUE, it means that data is consistent and its integrity has not been violated. However, if logically FALSE, it means that there is some computed or malformed data. Thus it is desired that the invariant should always be logically TRUE in a given system. Furthermore, a mechanism is provided that allows the invariants to be run without effecting performance of the live system.

The invention creates a set of invariants that are run automatically, and all exceptions are reported in an automated manner. Invariants may be applied to server side applications in general including billing and provisioning systems. Specifically, invariants can be applied in data migrations to ensure that data is properly migrated, in a running system to ensure data integrity is maintained, and to manage forks or code over periods of time to ensure that semantics of data are maintained by both forks or to immediately highlight differences as they happen.

The invariants may be expressed in several different ways, including through SQL (Structured Query Language) queries, e.g., all customers should have a first name, as well as the last name. Additionally, custom code may be written in any programming language to do the analysis.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following detailed description of the invention when considered in conjunction with the drawings.

DETAILED DESCRIPTION OF THE INVENTION

Figure 1:
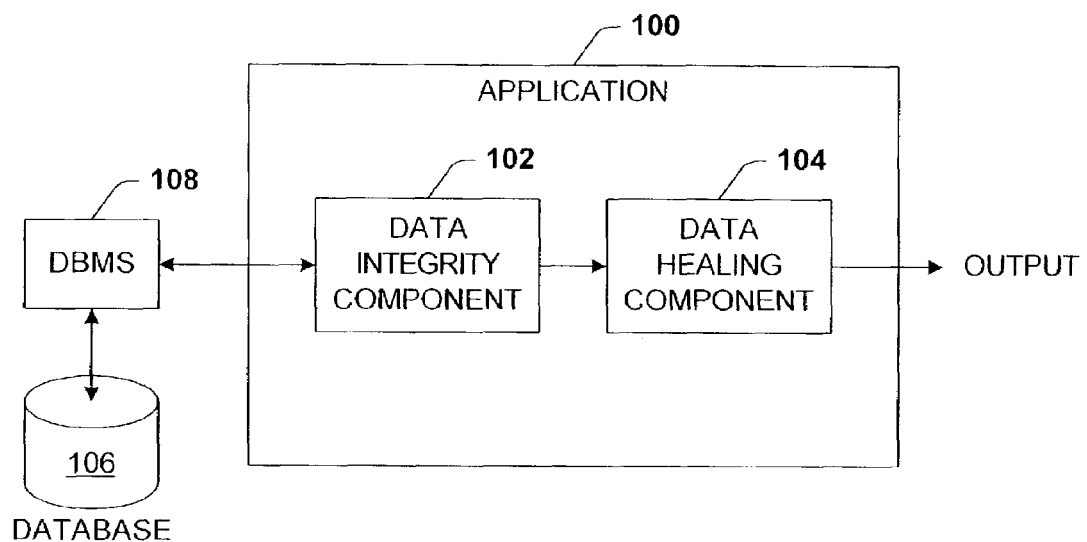
FIG. 1 illustrates a block diagram of a system in accordance with the present invention.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

As used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Referring now to FIG. 1, there is illustrated a block diagram of a system in accordance with the present invention. A database management system can manage some data integrity checks of its database, but not all. An application using the data must ensure that certain aspects are always TRUE, which are things that the database may not be capable of enforcing, or if it can, would be too costly in terms of performance to enforce. The disclosed architecture utilizes application-specific invariants in the form of an application tool to ensure that data accessed by the application is consistent. An invariant is defined generally as a context-based rule, which is different from a format-based rule. That is, the context-based rule processes data according content or meaning of the rule, and not structure to which a format-based rule applies. The invariant detects anomalous data that does not follow the corresponding context-based rule, which rule is unenforceable by the database management system. For example, a rule may be invoked by the application to "find all customers who have paid for a service, but are not getting the service." Two tables are in the system: a first table for "all who have paid" and a second table for "those who are getting service". The query involves all who are in the first table but not the second. Thus data that does not conform to the rule is detected as anomalous. Furthermore, the disclosed architecture may further tag (or flag) and/or even correct (or "heal") the anomalous data such that it can be used by the application at the present time or a later time. In general, however, the query may be an arbitrary complex query that returns only one table of the required dataset, instead of intermediate tables.

There are at least two uses of invariants. Firstly, invariants are used to ensure that a running system is behaving properly. For this purpose, the tool application (also called a rule application) may be run on a predetermined periodic schedule (e.g., daily, weekly). If scheduled daily, the tool may be run every evening when user activity is minimal, without any external trigger. Thus it will be up to the user to decide the schedule. The user may run the tool manually on demand, as well, if there is a suspicion of some data problems. Secondly, invariants may be invoked when data migration is performed. When data is migrated, there is a high probability that the system may be inconsistent. Thus invariants may be used as an integrity check for data migration. Again, the process may be suitably configured to allow the user invoke the invariant before migration and/or after migration, according to user demands. Data migration may also be a prescheduled event such that the tool is automatically invoked before and/or after the data migration, with results are then reported to the technician performing the migration.

In furtherance thereof, there is provided an application 100 having associated therewith a data integrity component 102 and a healing component 104. The application 100 periodically accesses a database 106, which database 106 may be local to the application that wants to use it (e.g., local hard drive), or disposed remotely on a conventional network that is accessible via wired or wireless communications means. In any case, there may be associated therewith a RDBMS (Relational Database Management System) 108 to manage the database. The management function may include, but is not limited to, performing batch processing on the database data according to one or more invariants to ensure the integrity of the data for that invariant purpose, receiving invariants from remote locations and then processing the invariants against the database, communicating with other RDBMS to cross process invariants according to predetermined criteria, etc.

Where the invariant processing returns dirty data, the healing component 104 will attempt to rectify the data, but where it cannot, the data may be tagged (or flagged) as anomalous. The invariant drops the anomalous data into a predefined format such that the healing component 104 can process it and fix it. In some cases, there is no automated way to fix the bad data. An administrator or user may then be notified such that manual inspection and correction may be performed, or the data corrected or processed by other means.

Thus the disclosed architecture performs a detection function, which is novel over conventional systems that may be initially designed to only avoid these types of data problems.

Figure 2:
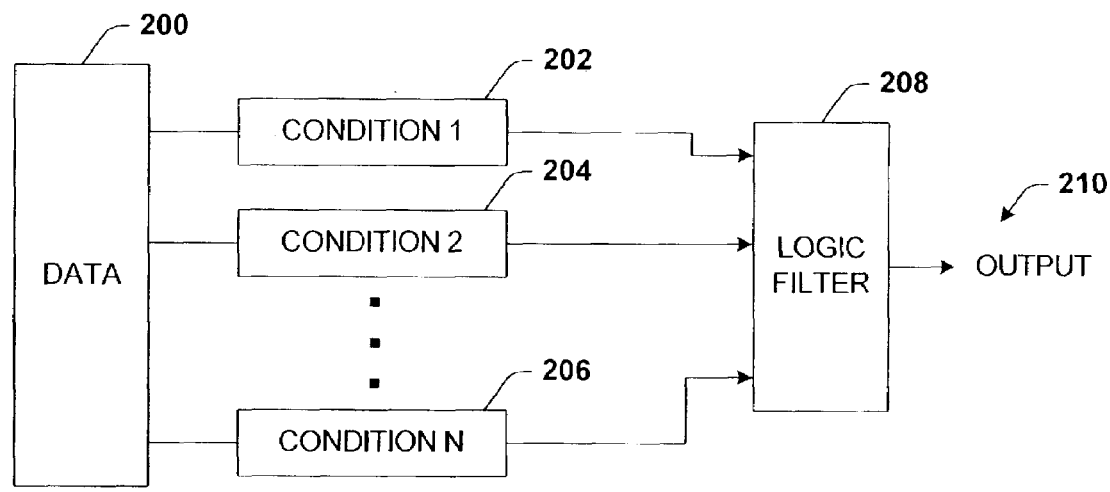
FIG. 2 illustrates a block diagram of a general invariant processing system.

Referring now to FIG. 2, there is illustrated a block diagram of a general invariant processing system. There is provided a set of data 200 of which all or certain portions thereof are desired to be interrogated for correctness. The invariant may comprise one or more logical conditions (202, 204, and 206), also denoted respectively as Condition 1, Condition 2, . . . , Condition N, that need to be tested against all or portions of the data 200. The user can test for consistent (i.e., good) data, or inconsistent (i.e., dirty) data.

Once the number and context of the conditions are determined, all conditions and corresponding data are processed logically through a logic filter 208 to arrive at a logical output 210 (e.g., logical TRUE or FALSE). Typically, the invariant will utilize more than one condition, e.g., condition 202 and condition 204 to detect dirty data. An example used previously involved two conditions: "return all data related to a customer who paid for a service, yet did not receive the service". However, a single condition may be utilized against the data 200 to also detect anamolous data. For example, where the user knows that the output 210 should be particular result, the user may invoke a rule such as the following: "return all data associated with the year is 1905", when the user knows that there should be no data related to that year.

Figure 3:
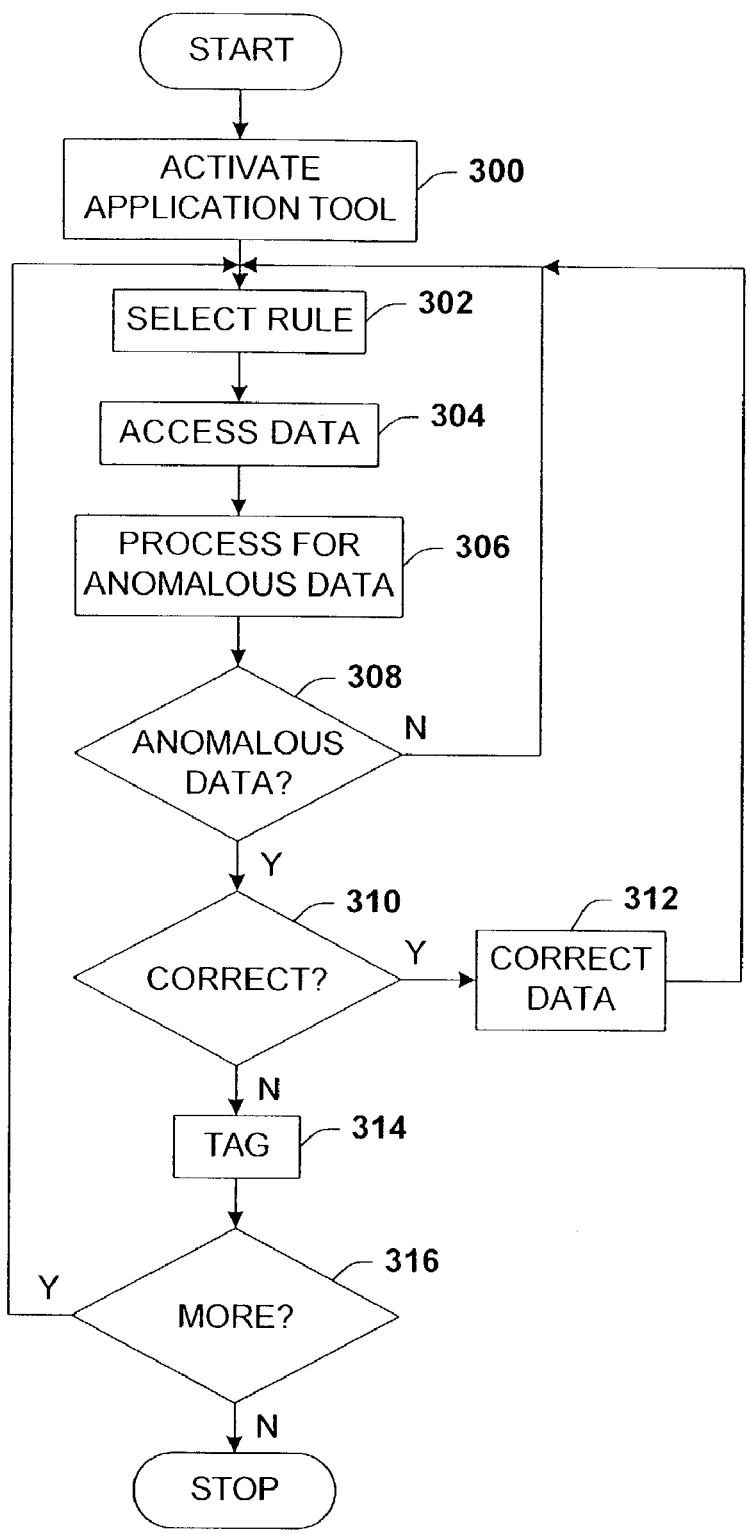
FIG. 3 illustrates a flow chart of a methodology of using the invariant(s) of the present invention.

Referring now to FIG. 3, there is illustrated a flow chart of a methodology of using the invariant(s) of the present invention. While, for purposes of simplicity of explanation, the one or more methodologies shown herein, e.g., in the form of flow chart, are shown and described as a series of acts, it is to be understood and appreciated that the present invention is not limited by the order of acts, as some acts may, in accordance with the present invention, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the present invention.

Flow begins at 300 where the context-based application tool is activated to enable the processing of data to ensure its integrity. Note that the application tool may be packaged as an integral part of a general application such as a word processing application, network operating system, client operating system, etc., or any application that handles data. However, whether the application tool is part of a general application or standalone, it is preferable that the implementation be suitably configured to allow the processing, detection, correction, and/or tagging of anomalous data either automatically (without requiring user activation) or manually.

At 302, the tool accesses an invariant rule to be processed for the particular data processing event. The rule may be input by the user for the specific event being processed. Alternatively, the rule may be selected from a list of commonly used prepared invariants. Note that additionally, the rule(s) may be written and preselected for association with a specific event that occurs. For example, if a data migration event occurs for a subset of the database, one or more rules may be preselected to be automatically run against the data subset that is being migrated to ensure data integrity once the migration process is completed. These rules may be written for a general vendor product that is commonly used in the industry, or written in a customized fashion for individual users according to specific needs.

At 304, the application then accesses the database to extract data corresponding to the invariant rule. At 306, the integrity check is performed to detect anomalous data. At 308, if NO anomalous data is detected, flow is back to the input of 302 to select the next rule for application. This may be the previous rule selected for processing against the existing dataset (i.e., all or a subset of the data in the database) or a different rule against the same or a different dataset. If YES, anomalous data has been detected, and flow is from 308 to 310 to determine if the anomalous data can be corrected (or rectified). If YES, flow is to 312 where all or a portion of the dataset is corrected. Flow is then back to the input of 302 to make the next rule selection.

Alternatively, if some or all of the dataset cannot be corrected, flow is from 310 to 314, where the uncorrectable data is tagged (or flagged). At this point, the tool application may be suitably configured to issue a message to the user indicating that uncorrectable data has been found, the dirty data is tagged according to a unique tag, and that other measures must be taken to correct or handle the data.

Flow is then to 316 where it is determined whether more data needs to be processed. If YES, flow is back to the input of 302 to make the next rule selection. Otherwise, if NO, the process reaches a Stop block. Note, however, that it is preferable that the amount of data retrieved be of a size that can be processed without interrupting or slowing performance of the data application requiring the data.

It is to be appreciated that although a data subset (i.e., a dataset) is extracted of all data matching the invariant rule, the size of the dataset selected for detection processing may be limited by the capabilities of the tool application, the data application requesting the data, and/or system bandwidth. For example, if one thousand results are returned at the output, the system may only be capable of processing two hundred results before the data application requires the data. This will address hereinbelow.

In acting according to a predetermined detection plan, after the tool is launched, data is accessed according to one or more invariants, as indicated at 302. However, it is to be appreciated that 302 and 304 may be reversed, such that the tool launches periodically according to predetermined criteria to first determine if an integrity check needs to be performed. This criteria may include, but is not limited to, the passage of time, the passage of time since the last data check, the importance of the particular data to the company or user, the fact that dirty data was previously detected on a particular dataset, a predetermined time, number of users of the data, geographic location of the data, and system parameters utilizing the data. This will be described in more detail hereinbelow.

It is to be further appreciated that the tool may be automatically activated at the local source to process data requested by a remote process such that the data is first processed for anomalous data at the local source before being transmitted to the remote process.

The data need not be part of a database normally associated with a client/server environment, but may reside in any structured data location. For example, the data may reside in the same location as the application. The data may also be distributed across several local locations (e.g., local hard drive, RAM memory), several remote locations (e.g., server hard drive, server memory), or a combination of local and remote locations (e.g., local hard drive, server hard drive).

Figure 4:
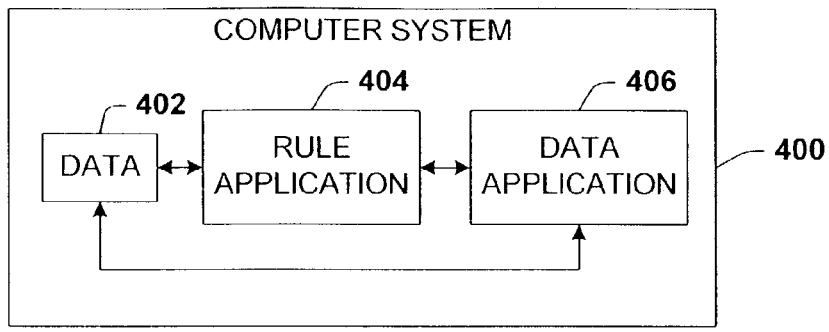
FIG. 4 illustrates a block diagram of a system where data, an application that uses the data, and an invariant-based application tool all reside locally on the same system.

Referring now to FIG. 4, there is illustrated a block diagram of a system 400 where data 402, an application 404 that uses the data 402, and an invariant-based application tool 406 all reside locally on the same system 400. Here the application tool 404 is shown separate from the data application 406. Thus the user may interact directly with the application tool 404 to either manually or automatically invoke invariant(s) to check the data, and/or access the resulting dirty data for further processing. The data application 406 may also access the data 402 directly for conventional processing.

Figure 5:
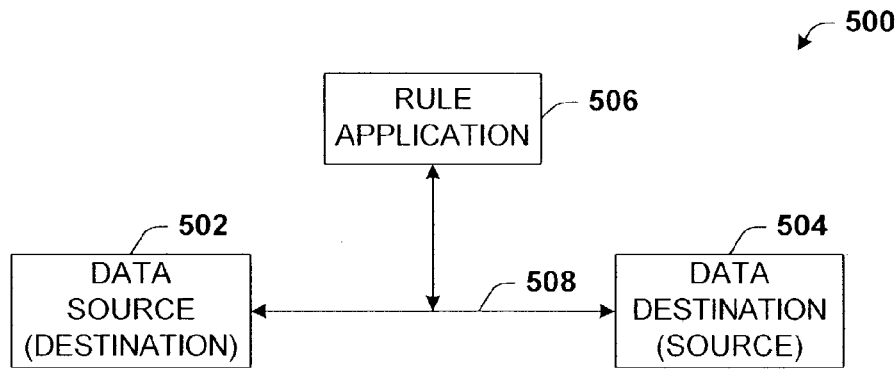
FIG. 5 illustrates a block diagram of a system where a data source and a data destination are separate from a rule application.

Referring now to FIG. 5, there is illustrated a block diagram of a system 500 where a data source 502 and a data destination 504 are separate from a rule application 506. For example, each of the data source 502, data destination 504, and rule application 506 may be separately disposed on a network 508 such that in a first mode, data may be passed freely between the data source 502 and the data destination 504 without interrogation by the rule application 506. In a second mode, the rule application 506 may be invoked to check data integrity according to one or more invariants on either the data source 502 or the data destination 504 in separate operations even though no data will be passed between the nodes 502 and 504. In a third mode, the rule application 506 is invoked to check data integrity according to one or more invariants on both the data source 502 and the data destination 504, in an interleaved methodology. In a fourth mode, the data source 502 may remotely request that the rule application 506 check its data before the data is passed to the data destination 504. Similarly, the data destination 504 may request that the remote rule application 506 check the data of the data source 502 before all or portions thereof are passed to the data destination 504.

Of course, the system 500 may include providing both the data source 502 and the data destination 504 in a single local unit, whereas the rule application 506 is remote therefrom. The system 500 may also be suitably configured to include the rule application, data source 502 and data destination 506 in the same unit.

Figure 6:
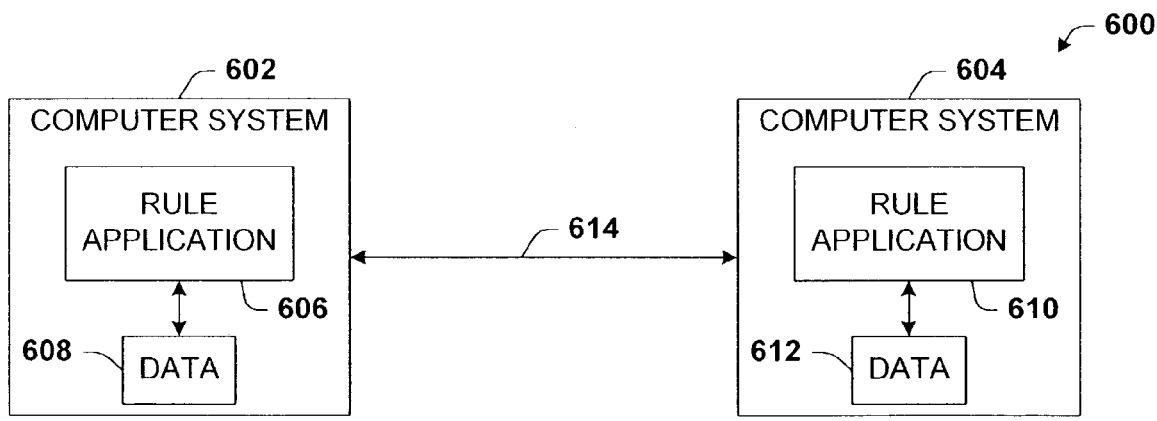
FIG. 6 illustrates a block diagram of a system where at least a first system and a second system interact to perform data integrity checks in accordance with the present invention.

Referring now to FIG. 6, there is illustrated a block diagram of a system 600 where at least a first system 602 and a second system 604 interact to perform data integrity checks in accordance with the present invention. The first system 602 includes a first rule application 606 and a first data source 608. The second system 604 includes a second rule application 610 and second data source 612. The first and second systems (602 and 604) communicate via a wired or wireless communication connection 614, which may be peer-to-peer network, and/or any form of TCP/IP network (e.g., Internet, LAN, WAN, WWAN).

The first and second systems (602 and 604) may operate in accordance with any of the system descriptions described herein, but may further communicate rules to one another for the purpose of remotely invoking the rule application. For example, the first system 602 may signal the second system 604 to process a specific invariant or set of invariants on the second data 612. Similarly, the second system 604 may signal the first system 602 to process a specific invariant or set of invariants on the first data source 608. The first system 602 may also signal the second system 604 to apply one or more rules to its first data source 608. In another mode, the second rule application 606 may invoke a rule such that a first condition of the rule returns data from the first data source 608 and a second condition of the same rule returns data from the second data source 612.

Thus where the database is distributed over several locations, application of the rule may require applying the rule in a number of smaller queries on the several databases. For example, if the database is distributed in three modules across three servers, the query may require that a first condition of the rule be applied against the first server database, which resulting data is transmitted to the second server for aplpying a second condition of the same rule against the second server database. The second resulting dataset, which may be smaller in size than the first dataset, is then transmitted to the third server, where a third (and perhaps a fourth) condition of the same rule is applied against the third database of the third server the result of which may be the final anomalous dataset.

Thus it is easy to see that one or more invariants may be applied wholly or in parts against separate databases distributed across many local and remote locations. It may also entail taking a copy of the entire database of a first location to a second location to complete the rule application process. This is similar to joining tables, the techniques of which are conventional.

In order to invoke the rule applications (606 and 610), signaling may be performed manually and automatically in at least two ways, including transmitting the specific invariant(s) to the destination system for execution or transmitting signals that identify specific invariants for execution that already reside on the destination system. This may be performed in a synchronized fashion among many different systems (602 and 604) where the need occurs. The signaling may be performed in response to a request to do so from an outside system. The signaling may be performed to process data integrity checks before the data is passed to an outside destination, or after the data has been received from an outside source.

Figure 7:
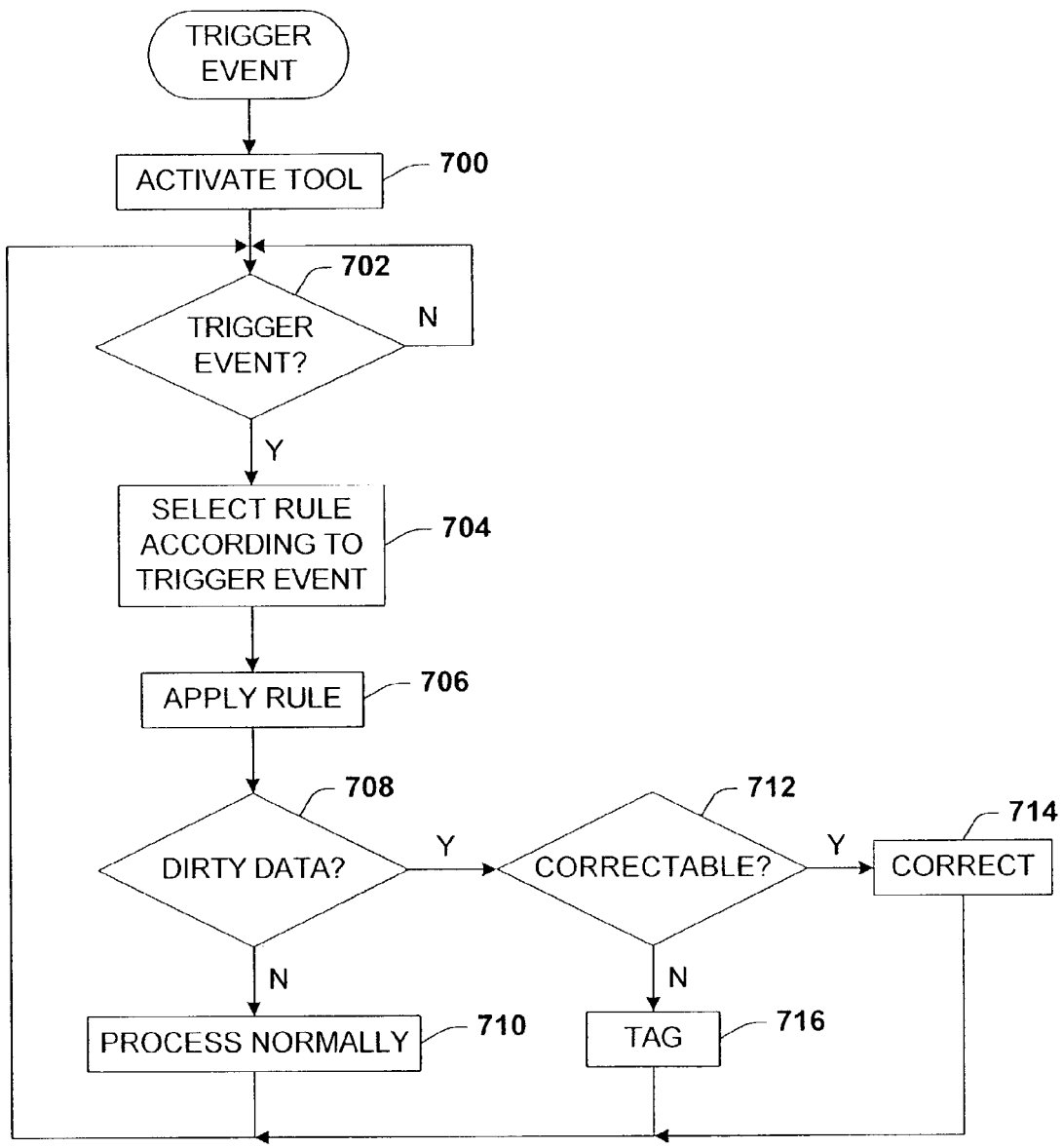
FIG. 7 illustrates a flow chart for initiating rule application based upon predetermined triggering events.

Referring now to FIG. 7, there is illustrated a flow chart for initiating rule application based upon predetermined triggering events. Flow begins at 700 where the rule application is activated. At 702, the system checks to determine if a triggering event has occurred. If NO, flow is back to the input to continue checking. This check is made by defining a number of triggering events that may be automatically accessed to invoke invariant testing of the data. It is also possible to reverse 700 and 702 such that the rule application is accessed only after a triggering event is detected. If a trigger event has been detected, flow is from 702 to 704 to select a rule that corresponds to the particular event. For example, if the trigger is the time of day, then the corresponding rule application may be programmed to execute one or more invariants to check certain portion of the data, or to execute a plurality of invariants to check all of the data.

At 706, the rule is applied to the data. At 708, it is determined whether dirty data has been detected. If NO, flow is to 710 to process the consistent data normally. Flow is then back to the input of 702 to detect the next triggering event.

At 708, if dirty data is found, flow is to 712 to determine if it is correctable. If YES, flow is to 714 to correct the data. Flow then loops back to the input of 702 to detect the next triggering event. If the data is not correctable, flow is from 712 to 716 to tag the dirty data such that the user may then access the data for further processing. Flow then loops back to the input of 702 to detect the next triggering event.

Figure 8:
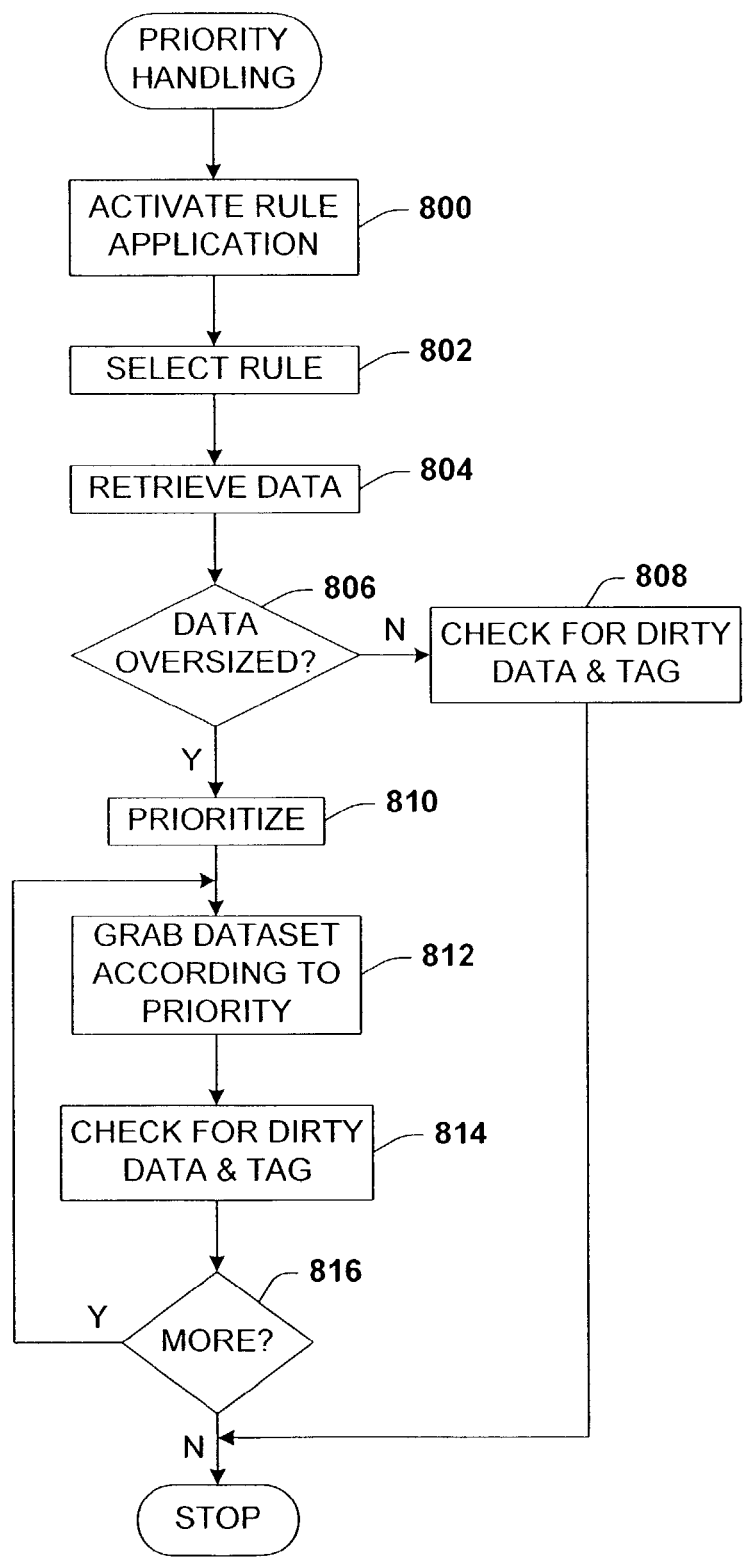
FIG. 8 illustrates a flow chart for priority data handling in accordance with the present invention.

Referring now to FIG. 8, there is illustrated a flow chart for priority data handling in accordance with the present invention. It is appreciated that in some instances, the amount of data returned according to a first of a plurality of invariant conditions, may be large. Since the system may get bogged down, the data must be handled accordingly to prevent the application tool or system from locking, stalling, or failing. One alternative is to prioritize the returned dataset according to the conditions. For example, if the first condition returns a large amount of data according to the first condition of the invariant, that dataset may be further processed according to predetermined criteria such that the system can process a smaller amount of data without delay or failing. For example, if the first condition returns all data for "who paid for service", and the result was a large dataset, the second condition may be invoked to "unclog" the system by requesting the data by month or by year.

Similarly, if the system processes the complete invariant such that the rule is "who paid for service that is not getting service", and the resulting dataset is still too large, the system is operable to automatically process the dataset into smaller blocks of data. For example, the previous example may automatically be processed by further sampling the dataset according to "those not receiving service in the last six months". If still too large, the rule may be automatically processed to ". . . the last three months". Thus the system of the present invention may provide a fallback position when the returned data is too large for the requesting application or system to handle.

Such a prioritization feature may be incorporated by a support vector machine (SVM), which can employ various artificial intelligence based schemes for carrying out various aspects of the subject invention. For example, the SVM may be used in a process for determining prioritization of a predetermined large set of invariant conditions. Where the returned dataset is too large, the SVM may prioritize the conditions to return an acceptable dataset that the requesting application can handle. The SVM may communicate the rule changes back to the requesting application to either "negotiate" or stipulate that the requested data has changed, and to adjust accordingly. Such classification can employ a probabilistic and/or statistical-based analysis (e.g., factoring into the computational costs, system bandwidth, invariant historical uses) to prognose or infer an action that a user desires to be automatically performed. For example, a SVM classifier can be employed. Other classification approaches include Bayesian networks, decision trees, Naive Bayes, Bayes Net, and other learning models and probabilistic classification models providing different patterns of independence can be employed. Classification as used herein also is inclusive of statistical regression that is utilized to develop models of priority.

The SVM prioritization feature may also be used where a plurality of rules may be applied against the data. Thus if a first rule returns a dataset that is too large, a second rule may be applied against that data that may return a reduced dataset. The second or subsequent rules may be automatically assembled with some probability that the included conditions will return the data requested by the requesting application or at least a subset thereof that may be used for processing until the next subset may be returned to continue the processing. Thus instead of performing a batch processing, the application tool may include or be operatively integrated with the SVM to facilitate the piecemeal return of datasets to facilitate continued data processing. Of course, to facilitate such an architecture, the SVM and application tool need to coordinate communication therebetween such that returned datasets or subsets of the datasets are handled smoothly.

As will be readily appreciated from the subject specification, the subject invention can employ classifiers that are explicitly trained (e.g., via generic training data) as well as implicitly trained (e.g., via observing user behavior, receiving extrinsic information) so that the classifier(s) is used to automatically determine according to a predetermined criteria which invariant conditions may be utilized to reduce the returned dataset. The criteria can include, but is not limited to, the amount of returned data, the number of conditions in the invariant rule, the importance of such data related to related to time, frequency of use, importance to the user, etc. For example, with respect to SVM's, and which are well understood, SVM's are configured via a learning or training phase within a classifier constructor and feature selection module. A classifier is a function that maps an input attribute vector, x—(x1, x2, x3, x4, xn), to a confidence that the input belongs to a class—that is, f(x)=confidence(class). In the case of classifying text based relational data collections, for example, attributes are words or phrases or other data-specific attributes derived from the words (e.g., presence of key terms, phrases), and the classes are categories or text fields of importance (e.g., levels of priorities).

The SVM may be utilized to track and trend the amount of previous dirty data found to effect the detection of the data according to increased probability of finding more dirty data. Since bandwidth and tool application operability is important for system functionality, it is preferred to that the returned dataset be small such that there is minimal delay, if any, in processing the data detection algorithm. Thus once the SVM detects that the system is finding datasets of dirty data that are becoming too large to handle, the SVM will seek to automatically execute, or at least notify the user, the detection process more frequently in order to reduce the amount of returned data. This feature will, of course, vary for each application for which the application tool is implemented, and the tool application itself.

The SVM may also be used as a prediction tool such that data that is more frequently returned under the prioritization feature may be "cached" for faster access the next time detection for that data is performed. This prediction feature also lends itself to a relating function that not only checks the selected data for anomalous data, but also provides a relation link to other data "modules" or related data that may need to be checked when the first database is selected or the corresponding dataset is returned.

It is to be appreciated that in live processes, where the data selected for checking is in use by the application and/or system, the disclosed architecture may be programmed to skip the data being used and any related data that may be required for use in the near "processing" future. This is because if data from a live process is accessed for detection, partial updates or changes during the live process may cause the detection process to find anomalous data, which if left alone to finish during the live process would have been reformed to pass the detection process. When such data is skipped due to live processing, that data may be prioritized for detection after the live process has released it.

In furtherance thereof, there is a methodology described such that at 800, the rule application is activated. At 802, the rule (or invariant(s)) is selected according to the specific application to the data. At 804, the data resulting from the first condition of the rule is returned. At 806, a determination is made as to whether the amount of data is too large. If NO, flow is to 808 where the data is checked for dirty data, corrected, and/or tagged. Flow then reaches a Stop block.

However, if the dataset is too large, flow is from 806 to 810 to perform prioritization. At 812, portions of the dataset are processed according to the predetermined priority criteria. When operating under such a prioritization scheme, the requesting application is suitably designed to adapt to a reduced set of requested data via signaling that a reduced set is being returned and according to a particular criteria. Thus the requesting application may take alternative measures to receive and process the returned data. At 814 the reduced set of retuned data is then examined for dirty data, corrected, where possible, and tagged for that data that cannot be corrected. At 816, of more data is to be processed, flow is to the input of 812 to retrieve the next subset of the dataset for processing. This subset is of course of lower priority than the first subset processed. This process continues until the last subset of the dataset is processed. When completed, flow is to the Stop block.

Figure 9:
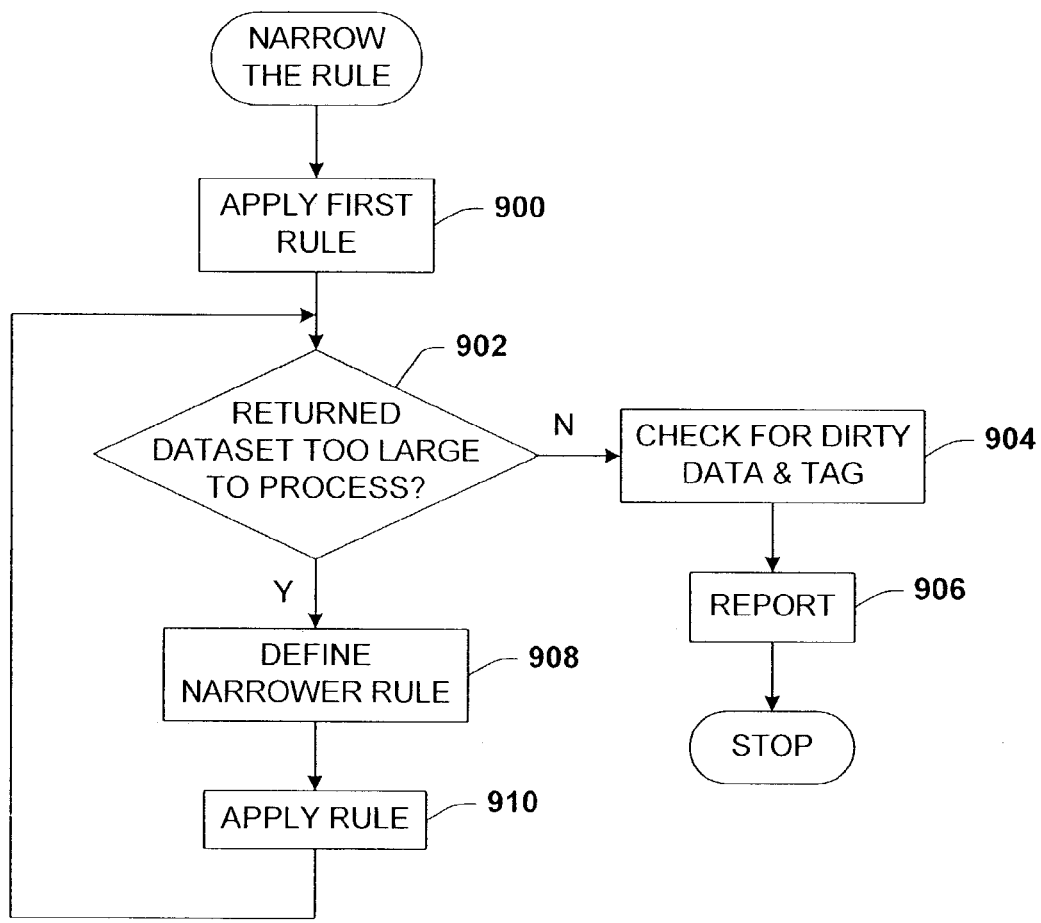
FIG. 9 illustrates a flow chart for utilizing a narrower rule when handling data in accordance with the present invention.

Referring now to FIG. 9, there is illustrated a flow chart for utilizing a narrower rule when handling data in accordance with the present invention. This particular methodology improves system handling of overly large returned datasets by narrowing the first invariant, if the returned dataset is too large to process. The rule is narrowed by either automatically and/or manually introducing additional conditions into the rule and applying the conditions of the rule successively to reduce the size of the returned dataset. At 900, a first rule is invoked against a database. A dataset is retuned, and at 902, it is determined if the dataset is too large to process in the allotted time. If NO, flow is to 904 where dirty data is detected, corrected, and if not correctable, tagged. Flow is then to 906 where a report may be provided to the user via a wired and/or wireless messaging service (e.g., e-mail, mobile personal device) summarizing the data analysis process. Flow then reaches a Stop block.

If the dataset is determined to be too large, flow is from 902 to 908 where a narrower rule is used against the database. That is, the first returned dataset is discarded, and the narrower rule is applied to return a smaller amount of data. Of course, communication of such a process is provided to the requesting application, and perhaps ultimately to the user to inform either of the alternative operation. As described hereinabove in FIG. 8, an SVM may be used to automatically determine what the narrower rule will be based upon a number of criteria, including, but not limited to, e.g., the type of requested data, the person requesting the data, and the time for returning the data. Alternatively, a manual implementation provides that the user may simply suggest alternative invariants to use if the requested dataset is too large.

At 910, the narrower rule is applied to the database to return another dataset. Flow is back to 902 to again determine if the dataset is too large to process. If not, flow is to 904 to analyze the data as previously described in this path.

Figure 10:
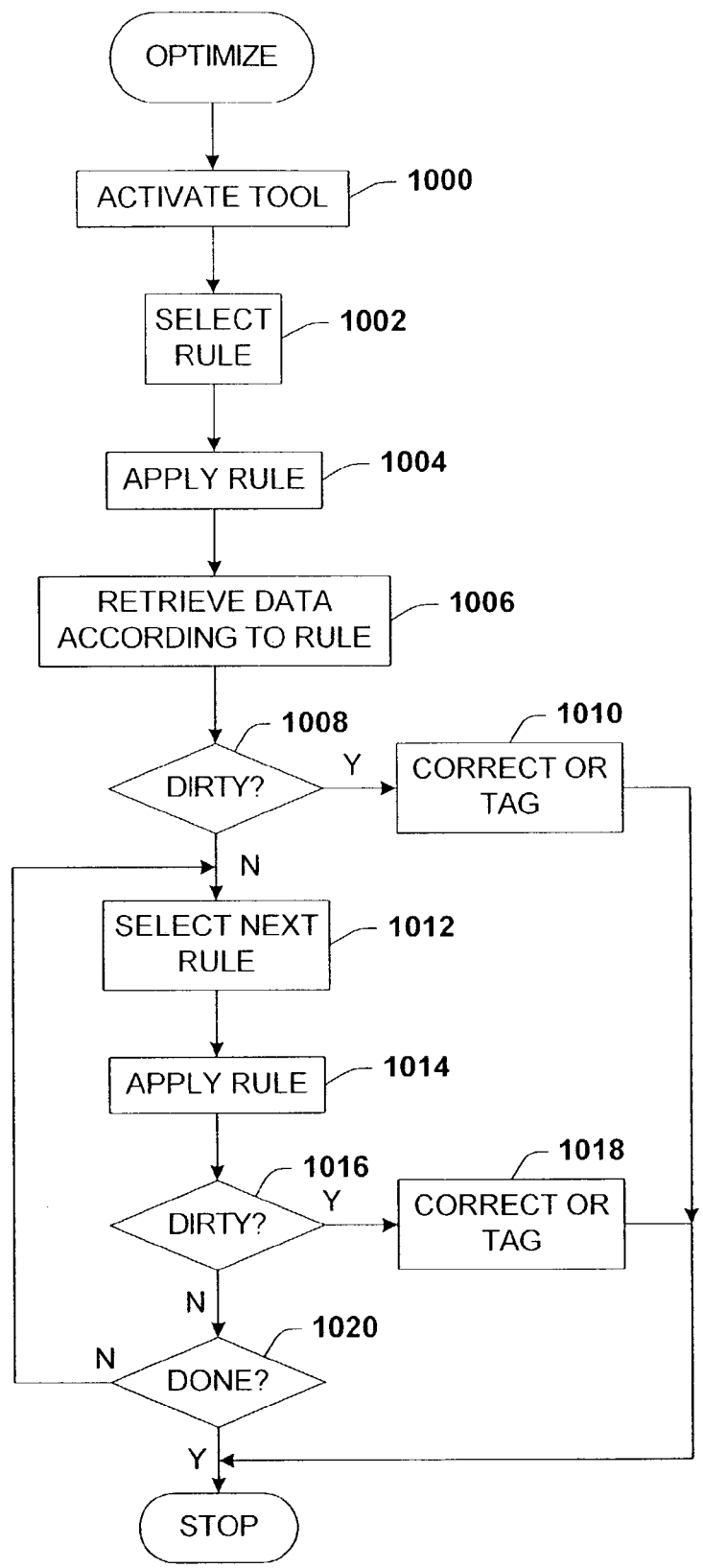
FIG. 10 illustrates a flow chart where one or more multiple rules are applied against previously returned datasets.

Referring now to FIG. 10, there is illustrated a flow chart where one or more multiple rules are applied against previously returned datasets. This methodology has the effect of further refining the invariants against the returned dataset, eventually interrogating the data of the dataset to either return dirty data or find that the dataset is clean. Note also that the rules applied in this instance are not the application of further conditions of the same rule, but separate rules applied against a returned data set. At 1000, the rule application tool is activated, whether automatically or manually. At 1002, a first rule is selected for application against a database. At 1004, the first rule is applied against the database. At 1006, a first dataset is then returned according to the first rule. The first dataset is then processed to determine if anamolous data is detected, as indicated at 1008. If YES, flow is to 1010 to attempt to correct and/or tag the dirty data. Flow then reaches a Stop block. Note that if the dirty data is correctable, and corrected, flow may be back to the input of 1002 to select another rule to apply against the corrected dataset.

If the data of the first dataset is determined to not be dirty, a second rule may be applied to further interrogate the returned dataset. Thus at 1012, a second rule is selected for application against the first dataset. The second rule is then applied, as indicated at 1014. If the resulting second dataset is dirty, flow is to 1018 to correct and/or tag the data. Again, after the data is either corrected and/or tagged, flow from 1018 reaches the Stop block. However, flow from 1018 could be routed back to the input of 1012 to apply a third rule against the second dataset. If the second dataset is not dirty, flow is from 1016 to 1020 to determine if the process is complete. If NO, flow is back to the input of 1012 to select a third rule. The process continues until no more data can be interrogated. Flow is then from 1020 to the Stop block.

Figure 11:
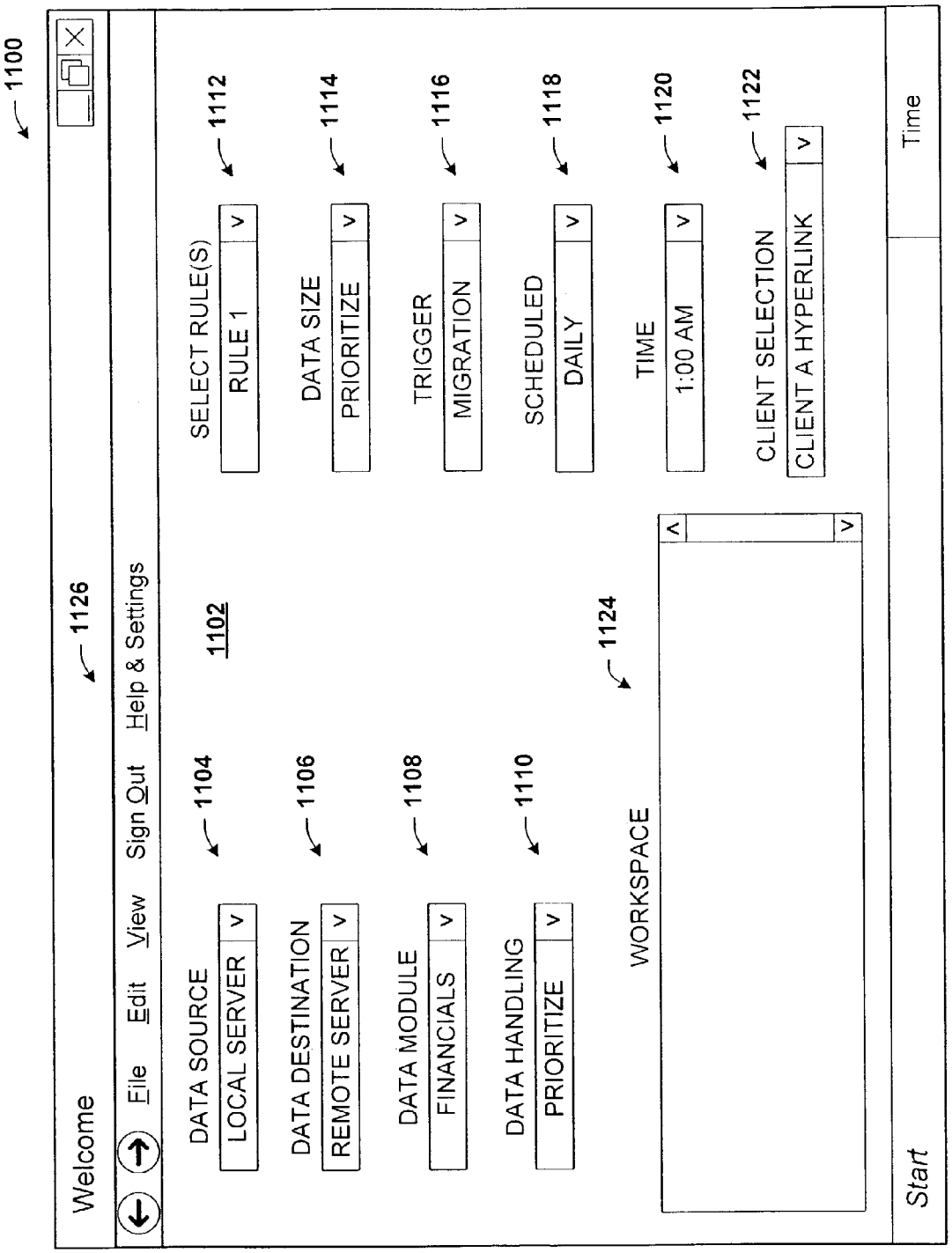
FIG. 11 illustrates an exemplary graphical user interface for managing the invariant application of the present invention.

Referring now to FIG. 11, there is illustrated an exemplary graphical user interface (GUI) 1100 for managing the invariant application for checking the data integrity system of the present invention. The GUI 1100 includes an input component for receiving management information associated with periodic application of the context-based rule to data, and a presentation component for presenting a representation of the management information.

The GUI 1100 presents a typical web page interface that provides conventional navigation and informational tools 1126. The web page includes a content area 1102 that presents a number of selections to the user for defining the implementation of the rule application. For example, a Data Source menu 1104 allows the user to select the source of the data. All menus provided herein are dropdown menus allowing for single or multiple selections. Thus the Data Source menu 1104 allows the user to select the location of the data from a single source to multiple sources. A Data Destination menu 1106 allows the user to select the destination of the returned dataset. This may include leaving the dataset at the location from which it was derived, or transmitting the dataset to a second location, or multiple locations for separate processing.

A Data Module menu 1108 allows the user to focus the detection process on a particular data module. For example, the user may want to focus on the financials data of the database. As indicated before, the menuing system allows the user to select one or more selections. Thus the user may select not only financials, but also any other data related or unrelated to it. A Data Handling menu 1110 allows the user to determine whether to, for example, prioritize the type of data returned. That is, if the returned dataset is too large, and determined to be a potential problem for the application and/or system to process, portions of the dataset can be selected for detection processing before other portions. For example, if the returned data was all customers in a one-year time frame that paid for services yet did not receive service, but the amount of data was too large, this option may be used to segment the returned data into more manageable portions. Thus the prioritization algorithm may be used to return the data in monthly, quarterly increments, or even six-month increments. Other prioritization criteria may be input to facilitate this feature.

The GUI 1100 also presents a Select Rule(s) menu 1112 for selecting one or more rules to be applied against the data source selected in the Data Source menu 1104. A Data Size menu 1114 allows the user to select the amount of data to be handled during the detection process. As indicated hereinabove, the process may include prioritizing the data returned, if it is determined that the returned dataset may be too large for the application/system to process without delay or causing other problems. Thus, for example, if the user selects no more than ten megabytes of data in the returned dataset, prioritization, as selected in the Data Handling menu 1110, will activate to ensure that the data set no larger than ten megabytes.

The GUI 1100 also includes a Trigger menu 1116 for automatically activating the rule application according to one or more predetermined triggering events. For example, this menu may include a Migration option, such that if data is migrated from application to another, the rule application will be applied to detect anomalous data. Additionally, this menu 1116 may further include a prescheduled detection Time option for one or more data locations. Thus when a time is reached, the rule application automatically activates to run the prescribed rules against the selected data sources. In furtherance thereof, a Scheduled menu 1118 and Time menu 1120 is provided to schedule the Time triggering events.

It is to be appreciated that the illustrated GUI 1100 presents only but a few of the user selections and options that may be included to further enhance the user management and control of the disclosed dirty data detection architecture. Thus the GUI 1100 may include any number of additional user selection options not shown, limited only by the desires of the user application. For example, a reporting option may be selected to send a report of the results to the user via any conventional method, e.g., e-mail and cell phone. The GUI 1100 may include a user login option to restrict access to only authorized individuals. The GUI 1100 may include a Rule Wizard that facilitates creation of the contest-based rules. The GUI 1100 may also include a Client Selection menu 1122 that displays a client hyperlink that automatically connects the user to other client or RDBMS site information such as a website that allows access to, for example, the RDBMS of the data source, data destination, vendor website, and more. The GUI 1100 may further be linked to an accounting system the automatically invoices a vendor according to the amount of data processed, the time utilized for processing the data, or for any other services contracted in conjunction with a provider of the disclosed architecture.

The GUI 1100 may also include a Workspace area 1124 that allows the user to manually enter a rule, or to create a rule for use in the data integrity system. The Workspace area 1124 also facilitates the presentation of system notification information related to the status of the data detection process. For example, a status report may be presented here after data processing has completed. Additionally, anomalous data may be presented here to the user for manual correction and review.

Figure 12:
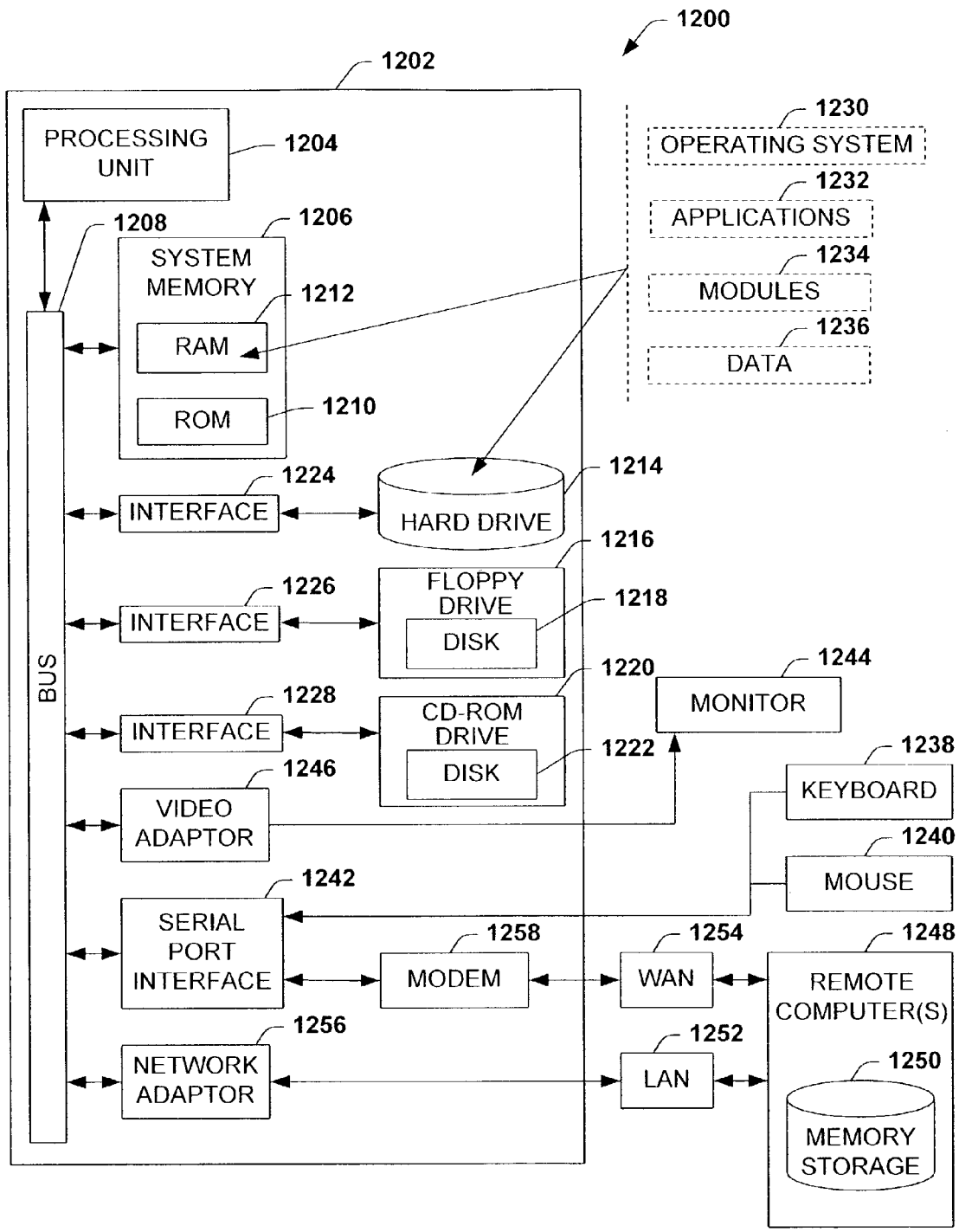
FIG. 12 illustrates a block diagram of a computer operable to execute the disclosed architecture.

Referring now to FIG. 12, there is illustrated a block diagram of a computer operable to execute the disclosed architecture. In order to provide additional context for various aspects of the present invention, FIG. 12 and the following discussion are intended to provide a brief, general description of a suitable computing environment 1200 in which the various aspects of the present invention may be implemented. While the invention has been described above in the general context of computer-executable instructions that may run on one or more computers, those skilled in the art will recognize that the invention also may be implemented in combination with other program modules and/or as a combination of hardware and software. Generally, program modules include routines, programs, components, data structures, etc., that perform particular tasks or implement particular abstract data types. Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based or programmable consumer electronics, and the like, each of which may be operatively coupled to one or more associated devices. The illustrated aspects of the invention may also be practiced in distributed computing environments where certain tasks are performed by remote processing devices that are linked through a communications network. In a distributed computing environment, program modules may be located in both local and remote memory storage devices.

With reference again to FIG. 12, there is illustrated an exemplary embodiment 1200 for implementing various aspects of the invention includes a computer 1202, the computer 1202 including a processing unit 1204, a system memory 1206 and a system bus 1208. The system bus 1208 couples system components including, but not limited to, the system memory 1206 to the processing unit 1204. The processing unit 1204 may be any of various commercially available processors. Dual microprocessors and other multiprocessor architectures also can be employed as the processing unit 1204.

The system bus 1208 can be any of several types of bus structure including a memory bus or memory controller, a peripheral bus and a local bus using any of a variety of commercially available bus architectures. The system memory 1206 includes read only memory (ROM) 1210 and random access memory (RAM) 1212. A basic input/output system (BIOS), containing the basic routines that help to transfer information between elements within the computer 1202, such as during start-up, is stored in the ROM 1210.

The computer 1202 further includes a hard disk drive 1214, a magnetic disk drive 1216, (e.g., to read or write to a removable disk 1218) and an optical disk drive 1220, (e.g., reading a CD-ROM disk 1222 or to read from or write to other optical media). The hard disk drive 1214, magnetic disk drive 1216 and optical disk drive 1220 can be connected to the system bus 1208 by a hard disk drive interface 1224, a magnetic disk drive interface 1226 and an optical drive interface 1228, respectively. The drives and their associated computer-readable media provide nonvolatile storage of data, data structures, computer-executable instructions, and so forth. For the computer 1202, the drives and media accommodate the storage of broadcast programming in a suitable digital format. Although the description of computer-readable media above refers to a hard disk, a removable magnetic disk and a CD, it should be appreciated by those skilled in the art that other types of media which are readable by a computer, such as zip drives, magnetic cassettes, flash memory cards, digital video disks, cartridges, and the like, may also be used in the exemplary operating environment, and further that any such media may contain computer-executable instructions for performing the methods of the present invention.

A number of program modules can be stored in the drives and RAM 1212, including an operating system 1230, one or more application programs 1232, other program modules 1234 and program data 1236. It is appreciated that the present invention can be implemented with various commercially available operating systems or combinations of operating systems.

A user can enter commands and information into the computer 1202 through a keyboard 1238 and a pointing device, such as a mouse 1240. Other input devices (not shown) may include a microphone, an IR remote control, a joystick, a game pad, a satellite dish, a scanner, or the like. These and other input devices are often connected to the processing unit 1204 through a serial port interface 1242 that is coupled to the system bus 1208, but may be connected by other interfaces, such as a parallel port, a game port, a universal serial bus ("USB"), an IR interface, etc. A monitor 1244 or other type of display device is also connected to the system bus 1208 via an interface, such as a video adapter 1246. In addition to the monitor 1244, a computer typically includes other peripheral output devices (not shown), such as speakers, printers etc.

The computer 1202 may operate in a networked-environment using logical connections to one or more remote computers, such as a remote computer(s) 1248. The remote computer(s) 1248 may be a workstation, a server computer, a router, a personal computer, portable computer, microprocessor-based entertainment appliance, a peer device or other common network node, and typically includes many or all of the elements described relative to the computer 1202, although, for purposes of brevity, only a memory storage device 1250 is illustrated. The logical connections depicted include a local area network (LAN) 1252 and a wide area network (WAN) 1254. Such networking environments are commonplace in offices, enterprise-wide computer networks, intranets and the Internet.

When used in a LAN networking environment, the computer 1202 is connected to the local network 1252 through a network interface or adapter 1256. The adaptor 1256 may facilitate wired or wireless communication to the LAN 1252, which may also include a wireless access point disposed thereon for communicating with the wireless adaptor 1256. When used in a WAN networking environment, the computer 1202 typically includes a modem 1258, or is connected to a communications server on the LAN, or has other means for establishing communications over the WAN 1254, such as the Internet. The modem 1258, which may be internal or external, is connected to the system bus 1208 via the serial port interface 1242. In a networked environment, program modules depicted relative to the computer 1202, or portions thereof, may be stored in the remote memory storage device 1250. It will be appreciated that the network connections shown are exemplary and other means of establishing a communications link between the computers may be used.

Figure 13:
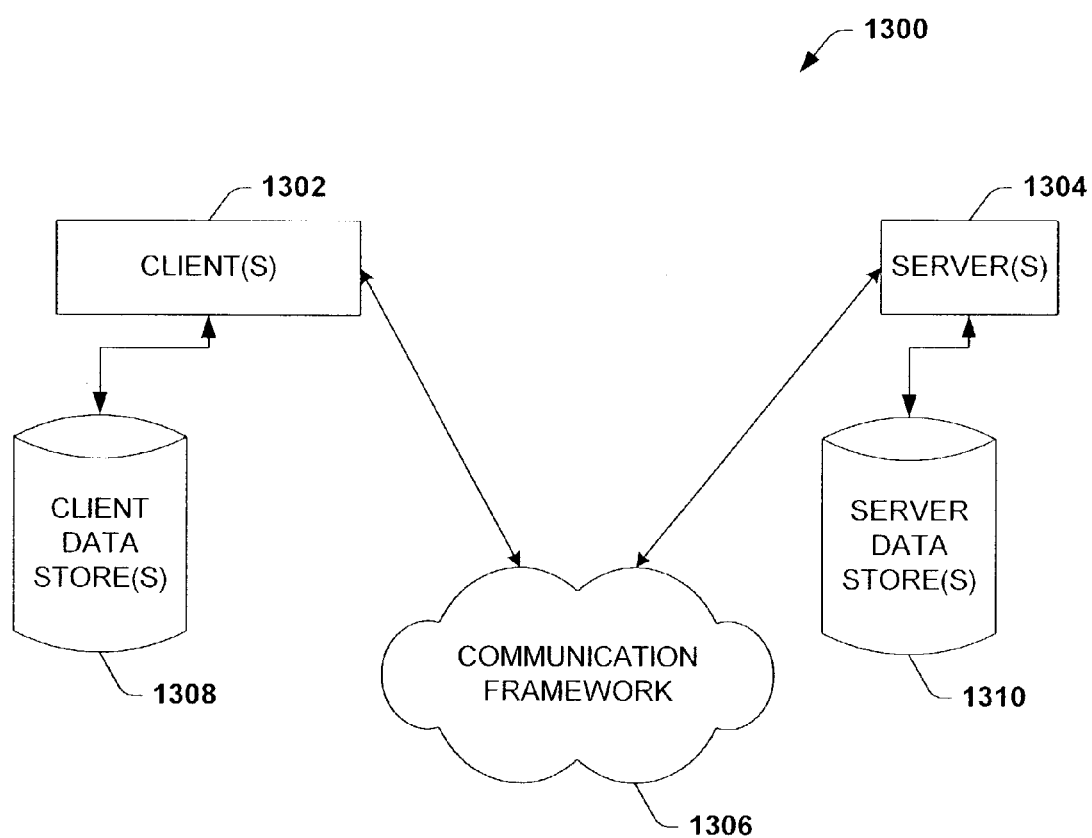
FIG. 13 illustrates a schematic block diagram of an exemplary computing environment in accordance with the present invention.

Referring now to FIG. 13, there is illustrated a schematic block diagram of an exemplary computing environment 1300 in accordance with the present invention. The system 1300 includes one or more client(s) 1302. The client(s) 1302 can be hardware and/or software (e.g., threads, processes, computing devices). The client(s) 1302 can house cookie(s) and/or associated contextual information by employing the present invention, for example. The system 1300 also includes one or more server(s) 1304. The server(s) 1304 can also be hardware and/or software (e.g., threads, processes, computing devices). The servers 1304 can house threads to perform transformations by employing the present invention, for example. One possible communication between a client 1302 and a server 1304 may be in the form of a data packet adapted to be transmitted between two or more computer processes. The data packet may include a cookie and/or associated contextual information, for example. The system 1300 includes a communication framework 1306 (e.g., a global communication network such as the Internet) that can be employed to facilitate communications between the client(s) 1302 and the server(s) 1304. Communications may be facilitated via a wired (including optical fiber) and/or wireless technology. The client(s) 1302 are operably connected to one or more client data store(s) 1308 that can be employed to store information local to the client(s) 1302 (e.g., cookie(s) and/or associated contextual information). Similarly, the server(s) 1304 are operably connected to one or more server data store(s) 1310 that can be employed to store information local to the servers 1304.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented system that facilitates discerning integrity of a data handling system, comprising:
    an identification component that periodically applies to data stored in a database accessed by an application, in a batch mode, a context-based rule, the rule is an invariant that is invoked at the application level to identify anomalous data that does not satisfy the rule, the anomalous data includes inconsistent data obtained during data migration; and
    a healing component that at least one of rectifies or flags the identified anomalous data.

2. The system of claim 1, the rule including one or more conditions that are applied against the data, the results of which determine the integrity of the data handling system.

3. The system of claim 1, the rule applied to the data at least one of manually and automatically.

4. The system of claim 1, where application of the rule to the data returns a dataset that is a subset of the data.

5. The system of claim 4, the dataset is derived from at least one condition of the rule.

6. The system of claim 4, the dataset is derived from the application of multiple rules to the data.

7. The system of claim 4, the dataset derived from applying a first condition of the rule to the data followed by subsequent conditions of the rule until anomalous data is identified.

8. The system of claim 1, the rule is invoked at the application level during migration of the data from a first application version to second application version.

9. The system of claim 1, the rule is applied to a single database that is distributed across several locations.

10. The system of claim 1, the rule is processed into multiple subparts, each rule subpart applied against correspondingly separate sets of the data.

11. The system of claim 1, the rule is processed into multiple subparts where each rule subpart is applied against the data or a correspondingly separate subset of the data, each subset located on respective systems, or at least in combinations of subsets on the systems.

12. The system of claim 1, the rule is applied to at least one of a running system to ensure data integrity is maintained and to manage forks of program code over periods of time to ensure semantics of the data.

13. The system of claim 1, the rule is invoked from an application that is at a location remote from the data.

14. The system of claim 1, the rule invoked from an application that is at a location remote from the data, the rule communicated from the remote location to the data location for application against the data.

15. The system of claim 1, the rule invoked from an application that is at a location remote from the data, the rule communicated from the remote location to a corresponding application local to the data, for application against the data.

16. The system of claim 1, the rule automatically applied in response to a triggering event.

17. The system of claim 1, the identification component returning a dataset in response to applying the rule to the data, and if the dataset is too large, the rule is narrowed to return a smaller dataset.

18. The system of claim 17, the rule is narrowed at least one of automatically and manually.

19. The system of claim 17, the rule is narrowed by introducing additional conditions into the rule and applying the conditions of the rule successively to reduce the size of the returned dataset.

20. The system of claim 17, the data handling system automatically notified to expect a reduced dataset of the data with which to process its request.

21. The system of claim 1, the identification component returning a dataset in response to application of the rule to the data, and if the dataset is too large, one or more different rules are applied against the dataset to reduce the size of the dataset.

22. The system of claim 1, further comprising a support vector machine for prioritizing rule conditions to return a manageable dataset of the data.

23. The system of claim 1, further comprising a support vector machine for prioritizing a plurality of different rules that may be applied against the data to return a manageable dataset of the data.

24. A computer according to the system of claim 1.

25. A network having disposed thereon at least one computer operable according to the system of claim 1.

26. The system of claim 1, the identification component and healing component comprising a rule application that is at least one of integrated into the data handling system and accessible external to the data handling system.

27. A computer readable medium having stored thereon the components of claim 1.

28. A computer-implemented graphical user interface that facilitates management of a data integrity system for discerning the integrity of a data handling system, comprising:
   an input component for receiving management information associated with periodic application of a context-based rule to data stored in a database that is accessed by an application, the context-based rule is an invariant specific to the application that is invoked at the application level; and
   a presentation component for presenting a representation of the management information, the management information includes at least information regarding anomalous data identified by application of the context-based rule, the anomalous data includes inconsistent data obtained during data migration.

29. The interface of claim 28, the management information including one or more configuration inputs for selecting at least one of a data source, data destination, one or more rules to be applied against the data, data type, type of data handling, size of the returned dataset, and triggering event(s).

30. The interface of claim 28, further including a user workspace for receiving user input for creating a rule that is applied against the data.

31. The interface of claim 30, the user workspace for receiving a system status information.

32. The interface of claim 28 facilitating the connection to a remote site via at least one of a hyperlink and a TCP/IP communication link.

33. A computer-implemented method of discerning integrity of a data handling system, comprising:
   periodically applying to data stored in a database that is accessed by an application, in a batch mode a context-based rule, the rule is an invariant specific to the application that is invoked at the application level to identify anomalous data that does not satisfy the rule, the anomalous data includes inconsistent data obtained during migration of data from a first application to a second application; and
   correcting the anomalous data.

34. The method of claim 33, further comprising at least one of tagging anomalous data that cannot be corrected and transmitting a message in response thereto.

35. The method of claim 33, the rule is invoked automatically or manually at an application level.

36. The method of claim 33, where application of the rule to the data returns a dataset that is a subset of the data, the dataset is derived from at least one of a condition of the rule and multiple rules.

37. The method of claim 36, the dataset derived from applying a first condition of the rule to the data followed by subsequent conditions of the rule until anomalous data is identified.

38. The method of claim 33, the rule is invoked at the application level during migration of the data from a first application to second application.

39. The method of claim 33, the rule is applied to a single database that is distributed in parts across several locations.

40. The method of claim 33, the rule is processed into multiple subparts, each rule subpart applied against correspondingly separate sets of the data.

41. The method of claim 33, the rule applied periodically according to at least one of a predetermined time, a data migration, the amount of anomalous data, the type of anomalous data, the importance of the data, and the frequency of anomalous data.

42. The method of claim 33, the rule is processed into multiple subparts where each rule subpart is applied against the data or a correspondingly separate subset of the data, each subset located on respective systems, or at least in combinations of subsets on the systems.

43. The method of claim 33, the rule is invoked from at least one of an application local to the data and an application that is remote from the data.

44. The method of claim 33, the rule is invoked by at least one of passing the rule from a remote location to a local rule application for processing and transmitting a signal to the local rule application instructing the rule to be invoked.

45. The method of claim 33, the rule automatically applied in response to a triggering event.

46. The method of claim 33, further comprising automatically limiting the amount of returned data after applying the rule by at least one of applying a narrower rule, successively applying more conditions of the rule, applying more related conditions according to a prioritization algorithm, selectively applying one or more different rules according to a prioritization algorithm, and returning the anomalous data in parts.

47. The method of claim 46, the prioritization algorithm operating according to a support vector machine.

48. A computer-implemented system for discerning the integrity of a data handling system, comprising:
   means for periodically applying to data stored in a database that is accessed by an application, in a batch mode, a context-based rule, the rule is an invariant specific to the application that is invoked at the application level to identify anomalous data that does not satisfy the rule, the anomalous data includes inconsistent data obtained during data migration;
   means for correcting the anomalous data; and
   means for tagging anomalous data that cannot be corrected.

* * * * *

UNITED STATES PATENT AND TRADEMARK OFFICE
CERTIFICATE OF CORRECTION

| | | |
|---|---|---|
| PATENT NO. | : 7,457,791 B1 | Page 1 of 1 |
| APPLICATION NO. | : 10/449208 | |
| DATED | : November 25, 2008 | |
| INVENTOR(S) | : Neeraj Garg et al. | |

It is certified that error appears in the above-identified patent and that said Letters Patent is hereby corrected as shown below:

In column 3, line 50, before "data" insert -- of --.

In column 9, line 51, after "via" insert -- a --.

In column 14, line 11, after "read" insert -- from --.

In column 17, line 41, in Claim 31, after "receiving" delete "a".

Signed and Sealed this
Twenty-sixth Day of April, 2011

David J. Kappos
*Director of the United States Patent and Trademark Office*